United States Patent
Ishibashi et al.

[11] Patent Number: 5,944,326
[45] Date of Patent: Aug. 31, 1999

[54] LINEAR GUIDE AIR CHUCK

[75] Inventors: Koichiro Ishibashi; Masayuki Hosono; Susumu Takada, all of Yawara-mura, Japan

[73] Assignee: SMC Corporation, Tokyo, Japan

[21] Appl. No.: 09/013,906

[22] Filed: Jan. 27, 1998

[30] Foreign Application Priority Data

Feb. 12, 1997 [JP] Japan .................................. 9-042927

[51] Int. Cl.⁶ .......................... B23B 31/175; B23B 31/30
[52] U.S. Cl. ...................... 279/4.04; 279/4.12; 279/119; 279/123; 901/37
[58] Field of Search ................................ 279/4.04, 4.12, 279/119, 123; 901/37

[56] References Cited

U.S. PATENT DOCUMENTS

| | | | |
|---|---|---|---|
| 2,775,461 | 12/1956 | Ehrlich et al. | 279/119 |
| 3,085,813 | 4/1963 | Sampson | 279/119 |
| 3,251,606 | 5/1966 | Oswald et al. | 279/119 |
| 4,892,344 | 1/1990 | Takada et al. | 901/37 |

FOREIGN PATENT DOCUMENTS

| | | |
|---|---|---|
| 0 170 103 | 2/1986 | European Pat. Off. . |
| 0 208 827 | 1/1987 | European Pat. Off. . |
| 0 293 153 | 11/1988 | European Pat. Off. . |

Primary Examiner—Steven C. Bishop
Attorney, Agent, or Firm—Oblon, Spivak, McClelland, Maier & Neustadt, P.C.

[57] ABSTRACT

Pinching of the fingers of an air chuck is prevented during opening or closing in order to allow them to open or close smoothly and to miniaturize the air chuck. In a linear guide air chuck having a rod that is operated by an air cylinder mechanism; a pair of fingers is provided that can be opened and closed to grip a workpiece; a guide mechanism moves the fingers linearly to open or close them; and a pair of levers convert operation of the rod into the opening and closing operation of both fingers the lever and finger being coupled together by fitting a spherical engagement element formed on the lever so, in a circular engagement hole cut in the top surface of the finger, at a position at which the acting force of the lever can be transmitted to the finger at nearly the same height as that of the guide mechanism.

5 Claims, 4 Drawing Sheets

LINEAR GUIDE AIR CHUCK

FIELD OF THE INVENTION

The present invention relates to an air chuck that grips a workpiece using a pair of fingers that can be opened and closed by air pressure, and in particular, to a linear guide air chuck that opens and closes the fingers using a guide mechanism.

PRIOR ART

FIG. 5 shows a conventional linear guide air chuck of this type. This air chuck has a rod 52 that is vertically moved by an air cylinder mechanism (not shown) built into a body 51; a pair of fingers 53, 53 that can be opened and closed to grip a workpiece; and a pair of levers 54, 54 that convert vertical movement of the rod 52 into the opening and closing action of the fingers 53, 53.

The fingers 53 are disposed between a pair of guide walls 55, 55 (only one of them being shown while the other that is located above the first wall in the direction perpendicular to the sheet of the drawing is omitted) formed at the lower end of the body 51; and a guide mechanism 59 formed between the guide wall 55 and the fingers 53 and rollably comprising rollers 58 between a guide groove 57 in the inner surface of the guide wall 55 and a guide groove 56 in the outer surface of the finger 53, so that the fingers 53, 53 are opened or closed linearly along the guide mechanism 59.

The lever 54 is approximately L-shaped, and its intermediate portion is rotatably pivoted to the body 51 by a supporting shaft 61, with its proximal end rotatably coupled to the rod 52 by a supporting shaft 62, and with its tip coupled to the finger 53 by fitting a U-shaped notch 63 to an engagement shaft 64 at the upper end of the finger 53.

When the rod 52 is moved vertically by the air cylinder mechanism, the pair of levers 54, 54 are rotated through a specified angle around the supporting shaft 61 to move the fingers 53, 53 linearly along the guide mechanism 59 in order to open or close them.

In such a conventional air chuck, the lever 54 and the finger 53 are coupled together by fitting the engagement shaft 64, provided on the finger 53, in the U-shaped notch 63 provided at the tip of the lever 54. To mount the engagement shaft 64 on the finger 53, however, a bearing portion 53a must be installed on the top surface of the finger 53 to support the engagement shaft 64 in order to avoid obstructing the guide groove 56 and rollers 58 provided on the outer surface.

Therefore, the coupling point between the lever 54 and the finger 53 is located above the guide mechanism 59 so that pinching acts on the finger when the lever 54 opens or closes the fingers 53, 53, preventing them from being opened or closed smoothly. In addition, the bearing portion 53a and engagement shaft 64 protruding upward from the top surface of the finger 53 prevents the chuck from being miniaturized.

DISCLOSURE OF THE INVENTION

It is a technical object of this invention to locate the coupling point between the lever and the finger lower than in the prior art in order to prevent pinching force from acting on the fingers during their opening or closing, thereby allowing the fingers to be opened and closed smoothly and miniaturizing the air chuck.

To achieve this object, an air chuck according to this invention is characterized in that it has an air cylinder mechanism that is operated when compressed air is supplied and discharged; a rod that is operated by the air cylinder mechanism; a pair of fingers that can be opened and closed to grip a workpiece; a guide mechanism that moves the fingers linearly in a direction in which the distance between them changes in order to open or close them; and a pair of levers provided between the rod and both fingers for converting operation of the rod into an opening and closing operation of both fingers, in that each pair of the lever and finger has a coupling mechanism comprising an engagement element formed at the end of the lever so as to be at least partly spherical; and a circular engagement hole cut in the top surface of the finger, and in that the engagement element is fitted in the engagement hole so that the acting force of the lever can be transmitted to the finger at almost the same height as that of the guide mechanism.

In the air chuck configured in the above manner, when the rod is operated by the air cylinder mechanism, the pair of levers move the corresponding fingers linearly along the guide mechanism to open or close them.

In this case, since the engagement element provided on the lever is fitted in the engagement hole cut in the top surface of the finger in such a way that they abut each other at nearly the same height as that of the guide mechanism, the force of the engagement element acts on the finger at almost the same position as that of the guide mechanism. This configuration prevents the pinching force associated with the opening and closing operation from being applied to the fingers, enabling them to open and close smoothly.

Furthermore, since the engagement element is spherical and fitted in the circular engagement hole so that its direction can be freely changed inside the engagement hole, even if the axis of the engagement element is somewhat twisted or tilted, the direction of the engagement element can simply be changed to absorb the twist or tilt reliably, thereby preventing an unwanted force such as pinching force or torque from acting on the coupling portion and affecting the operation.

In addition, since the coupling mechanism does not protrude upward from the top surface of the finger, the height of the finger can be reduced to miniaturize the size of the entire air chuck.

DETAILED DESCRIPTION

Figure 1:
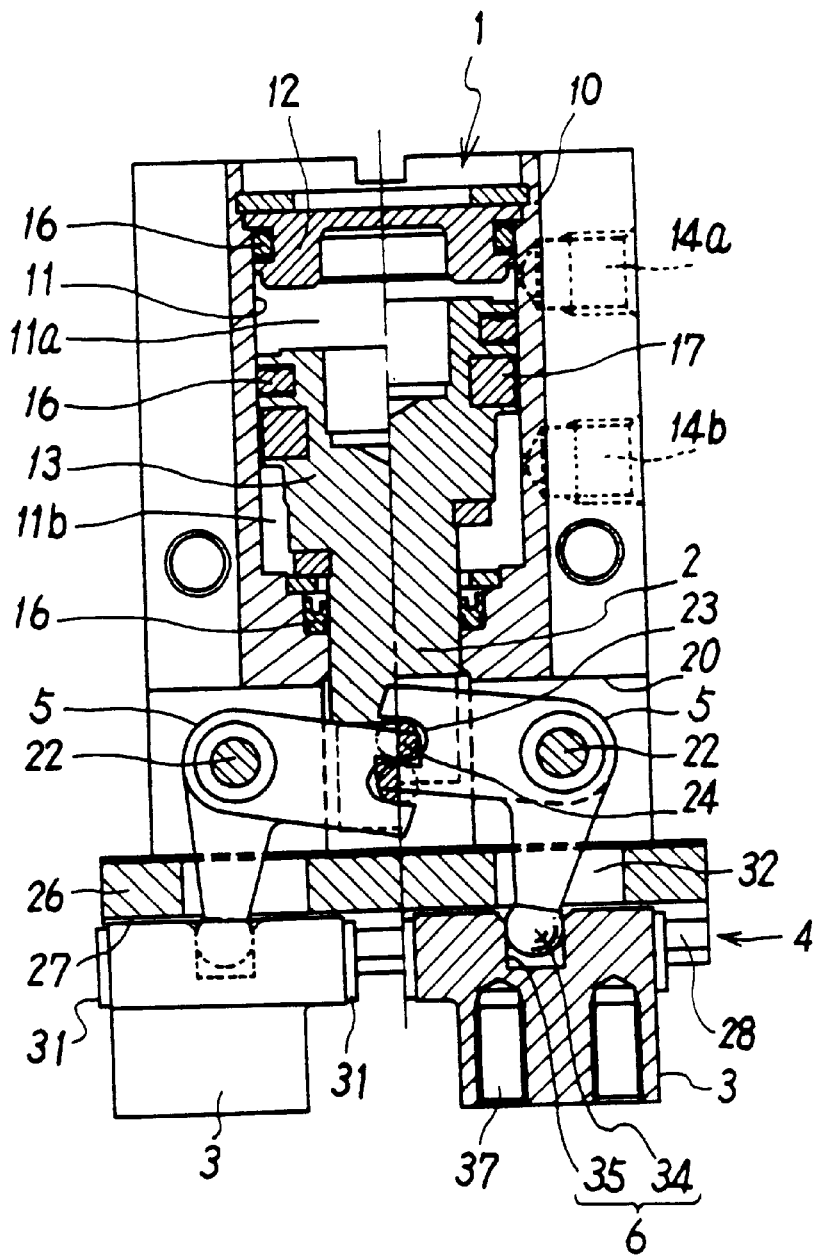
FIG. 1 is a vertical cross sectional front view showing one embodiment of a linear guide air chuck according to this invention wherein the right and left half have different operational conditions.
Figure 2:
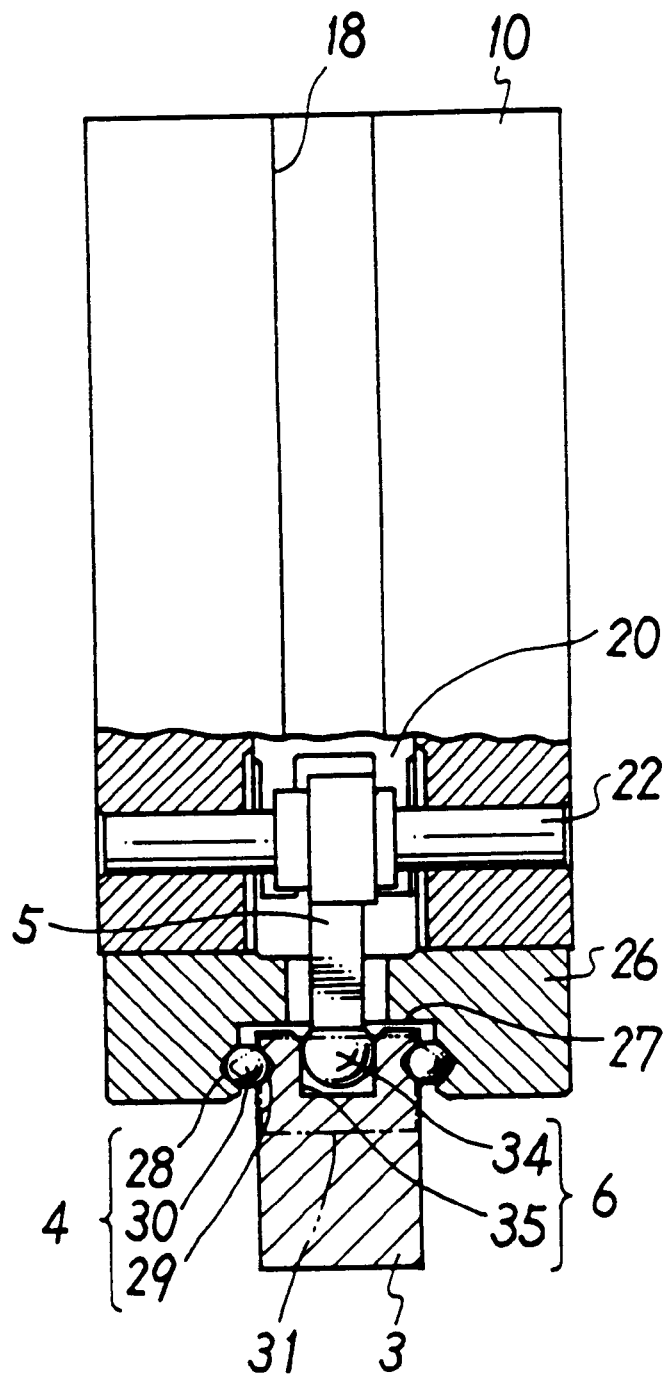
FIG. 2 is a side view showing an integral part of the air chuck in FIG. 1 from which the remaining part has been cut off.

FIGS. 1 and 2 show one embodiment of a linear guide air chuck according to this invention. The air chuck has an air cylinder mechanism 1 that is operated when compressed air is supplied and discharged; a rod 2 that is operated by the air cylinder mechanism 1; a pair of fingers 3, 3 that can be opened and closed to grip a workpiece; a guide mechanism 4 that moves the fingers 3, 3 linearly to open or close them; and a pair of levers 5, 5 provided between the rod 2 and both fingers 3, 3 for converting the operation of the rod 2 into the opening and closing action of the fingers 3, 3.

The air cylinder mechanism 1 has a cylinder hole 11 cut downward into a body 10 to a specified depth from the upper end of the body 10; a cap 12 that occludes the upper end of the cylinder hole 11 in a gas-tight manner; a piston 13 slidably inserted into the cylinder hole 11; and ports 14a, 14b for supplying and discharging compressed air that are individually linked to a head chamber 11a and a rod chamber 11b disposed on either side of the piston 13, wherein the piston 13 is formed integrally with the rod 2. In addition, the ports 134a, 14b are opened in one side of the body 10.

Thus, when compressed air is supplied to or discharged from the head chamber 11a and rod chamber 11b through the ports 14a, 14b, the piston 13 and rod 2 move back and forth between the position shown in the right half and the position shown in the left half in FIG. 1.

In the figures, reference number 16 is a seal member, and reference number 17 denotes a magnet mounted on the piston 13 to enable a magnet sensor (not shown) mounted in a mounting groove 18 in the outer surface of the body 10 to detect the operational position of the piston 13.

A recessed portion 20 is formed in the lower part of the body 10 so as to cross the body 10 laterally in FIG. 1, with the tip of the rod 2 and the pair of levers 5, 5 disposed in the recessed portion 20.

The lever 5 is approximately L-shaped, with its intermediate portion rotatably pivoted to the body 10 by a supporting shaft 22 and with a U-shaped notch 23 formed at its proximal end. The notch 23 is engaged with an engagement shaft 24 at the lower end of the rod 2 so that the lever 5 is rotated through a specified angle around the supporting shaft 22 when the rod 2 is moved upward or downward.

A guide block 26 is fixed to the lower end of the body 10 so as to occlude the recessed portion 20, and a recessed groove 27 is formed in the bottom surface of the guide block 26 so as to traverse the block. The pair of fingers 3, 3 are disposed in the recessed groove 27, and the guide mechanism 4 is formed between both groove walls of the recessed groove 27 and the outer surface of each finger 3,3.

The guide mechanism 4 consists of a first guide groove 28 formed in the respective groove walls of the recessed groove 27 along the groove 27; a second guide groove 29 formed in the outer surface of the finger 3 so as to be opposite to the guide groove 28; and a rolling element 30 such as a ball or roller interposed between the first and second guide grooves 28 and 29, wherein the rolling element 30 is rotated to move both fingers 3, 3 linearly back and forth along the guide mechanism 4. A plate 31 covering the end of the guide grooves 28, 29 is attached to the respective sides of the finger 3 to prevent the rolling element 30 from coming out of the guide grooves 28, 29.

A through-hole 32 is formed in the guide block 26 at respective positions corresponding to the levers 5, 5, and the end of the lever 5 protrudes into the recessed groove 27 through the through-hole 32 and is coupled to the finger 3 by a coupling mechanism 6 consisting of an engagement element 34 and an engagement hole 35. That is, the spherical engagement element 34 is formed at the end of the lever 5, while the circular engagement hole 35 in which the engagement element 34 is tightly fitted is cut in the top surface of the finger 3 so as to reach the position of the guide mechanism 4, and the engagement element 34 is fitted in the engagement hole 35 so that the acting force of the lever 5 can be transmitted to the finger 3 at nearly the same height as that of the guide mechanism 4. Thus, the diameter of the engagement hole 35 is nearly the same as that of the sphere in the engagement element 34.

In the figure, 37 is a mounting hole used to attach an adapter used to grip a workpiece to the finger 3.

In the air chuck according to the above embodiment, when compressed air is supplied to or discharged from the air cylinder mechanism 1 through the ports 14a, 14b, the piston 13 and rod 2 move upward or downward between the position shown in the right half and the position shown in the left half to rotate the pair of levers 5, 5 in opposite directions through a specified angle around the supporting shaft 22. When the levers 5, 5 are rotated, the engagement elements 34 at the end of the respective levers 5 are shifted, pendulum-like, around the respective supporting shafts 22 to move the pair of fingers 3, 3 linearly in opposite directions along the guide mechanism 4, enabling them to open and close.

In this case, since the engagement element 34 is fitted in the engagement hole 35 cut in the top surface of the finger 3 in such a way that they abut each other at nearly the same height as that of the guide mechanism 4, the force of the engagement element 34 acts on the finger 3 at nearly the same position as that of the guide mechanism 4. This configuration prevents the pinching associated with the opening and closing action from being exerted on the fingers, enabling them to open and close smoothly.

Furthermore, since the engagement element 34 is spherical and is fitted in the circular engagement hole 35 so that its direction can be freely changed inside the engagement hole 35, even if the axis of the engagement element 34 is somewhat twisted or tilted, the direction of the engagement element 34 can be changed to absorb the twist or tilt reliably, thereby preventing an unwanted force such as results from pinching or torque from acting on the coupling portion and affecting the operation.

In addition, since the coupling mechanism does not protrude upward from the top surface of the finger 3, the height of the finger 3 can be reduced to miniaturize the entire air chuck.

Figure 3:
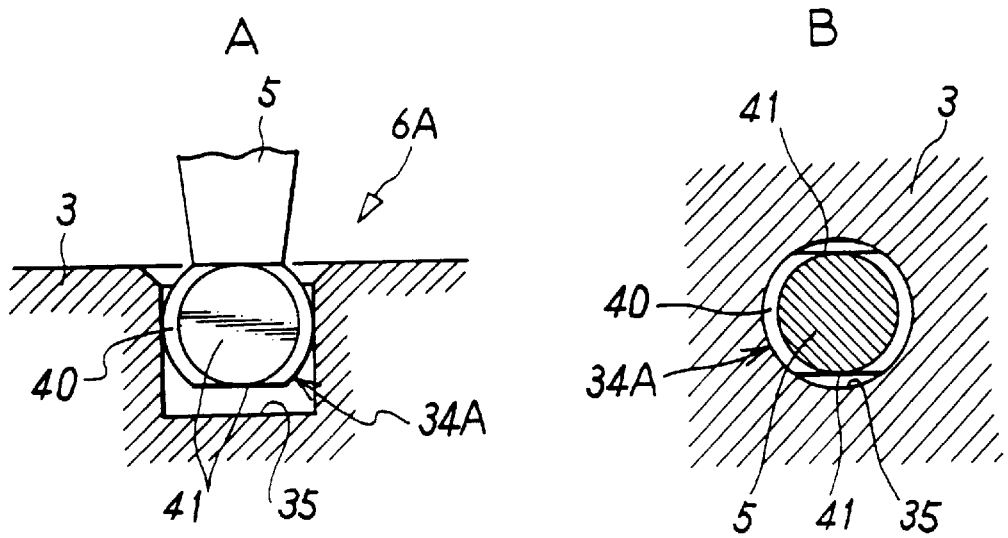
FIG. 3A is a front view showing in cross section an integral part of another example of a coupling mechanism for coupling a lever and a finger.
FIG. 3B is a plan view of FIG. 3A.
Figure 4:
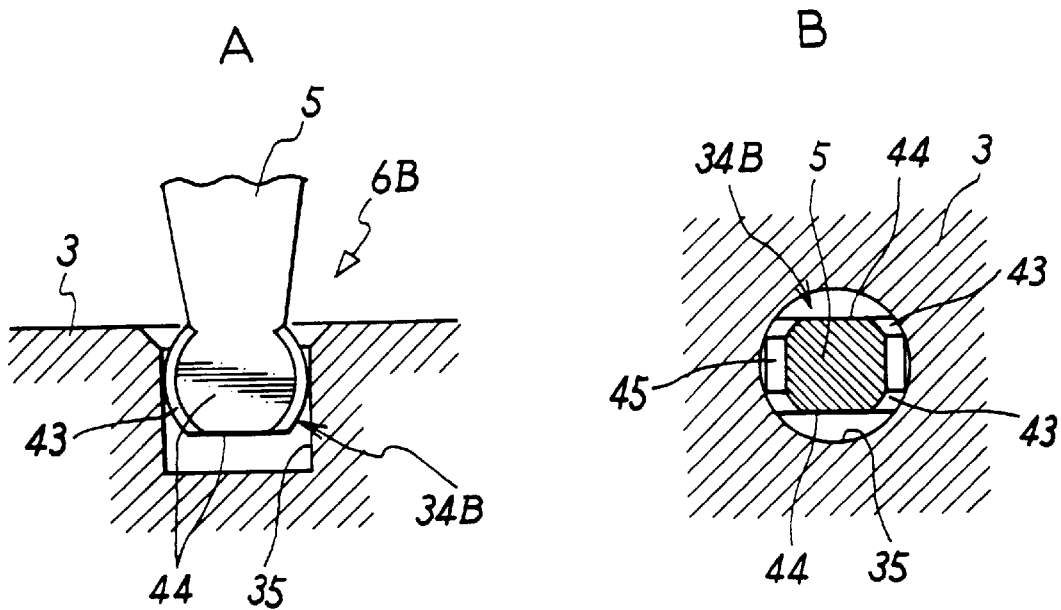
FIG. 4A is a front view showing in cross section an integral part of another example of a coupling mechanism for coupling a lever and a finger.
FIG. 4B is a plan view of FIG. 4A.
Figure 5:
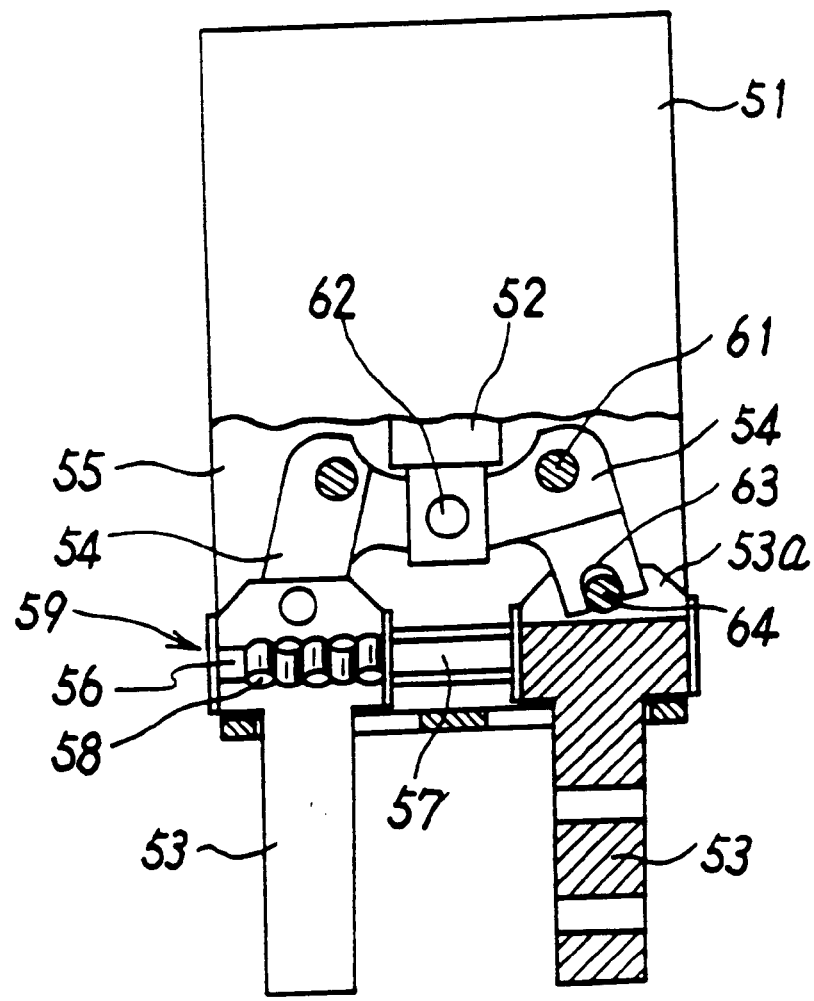
FIG. 5 is a front view showing an integral part of an example of a conventional linear guide air chuck in cross section.

Although, in the above embodiment the engagement element 34 provided on the lever 5 is nearly spherical except for the portion coupled to the lever 5, the engagement element 34 need not necessarily be perfectly spherical and it is sufficient that it is partly spherical and the spherical portion can be fitted into the circular engagement hole so that its direction can be changed as shown in FIG. 3 or 4.

In a coupling mechanism 6A, which is shown in FIGS. 3A and 3B, an engagement element 34A at the end of the lever 5 is formed so as to be spherical (a spherical portion 40), except for a plane portion 41 that is obtained by cutting off the right and left sides and bottom of the sphere, and the engagement element 34A is fitted in the circular engagement hole 35 cut in the top surface of the finger 3.

In a coupling mechanism 6B, which is shown in FIGS. 4A and 4B, an engagement element 34B at the end of the lever 5 is formed so as to be partly spherical (a spherical portion 43) by cutting the right and left sides and bottom of the sphere to form a plane portion 44 and circumferentially flattening the intermediate portion 45 of the remaining spherical portion, and the engagement element 34B is fitted in the circular engagement hole 35 cut in the top surface of the finger 3.

According to this invention, the lever and the finger are coupled together by fitting the spherical engagement element on the lever, in the circular engagement hole cut in the top surface of the finger, and the engagement element is fitted at nearly the same height as that of the guide mechanism, so the force of the engagement element acts on the finger at nearly the same position as that of the guide mechanism, thereby preventing pinching from being exerted on the finger when the fingers are opened or closed by the levers, enabling them to open and close smoothly.

Furthermore, since the coupling mechanism does not protrude upward from the top surface of the finger, the height of the finger can be reduced to miniaturize the entire air chuck.

What is claimed is:

1. A linear guide gripper having a compressed air cylinder mechanism, which comprises:

a rod driven in the axial direction by the air cylinder mechanism, a pair of openable and closable fingers that are linearly moved in a direction orthogonal to the axis of the rod in order to grip or release a workpiece, a guide mechanism which guides movement of said fingers, and a pair of levers, one of said levers being provided between the rod and each finger for converting operation of the rod into an opening and closing operation of the fingers, wherein each lever/finger pair has a coupling mechanism comprising a partially spherical engagement element formed at the end of the lever, the engagement element having a spherical shape, a pair of opposed flat faces and a circular engagement hole formed in a top surface of the finger, and wherein each engagement element is fitted in a corresponding engagement hole so that a force of the lever is transmitted to the finger at or in proximity with a position of the guide mechanism.

2. A gripper according to claim 1, which comprises a body in which the air cylinder mechanism, rod, and levers are assembled, and a guide block in which the guide mechanism and fingers are assembled, wherein the guide block is mounted on the end of the body in a position so as to partially cover a groove in which the levers are located, and wherein a through-hole is formed in the guide block in positions corresponding to the engagement holes in a top surface of the fingers so that the engagement element on the levers are fitted in the engagement holes in the fingers through the through-holes.

3. A gripper according to claim 1 wherein the guide mechanism includes, for each finger, a recessed finger groove in which the finger is movably fitted, a first guide groove formed in the groove walls of the recessed finger groove, a second guide groove formed on the outer surfaces of the finger opposite to the first guide groove, and a rolling element interposed between the first and second guide grooves, and wherein the engagement hole in each finger is positioned such that each engagement element contacts the corresponding engagement hole at substantially the same height as that of the guide grooves.

4. A gripper according to claim 2 wherein the guide mechanism includes, for each finger, a recessed finger groove in which the finger is movably fitted, a first guide groove formed in the groove walls of the recessed finger groove, a second guide groove formed on the outer surfaces of the finger opposite to the first guide groove, and a rolling element interposed between the first and second guide grooves, and wherein the engagement hole in each finger is positioned such that each engagement element contacts the corresponding engagement hole at substantially the same height as that of the guide grooves.

5. A gripper as claimed in claim 1, wherein each engagement element has a portion coupled to an associated lever which has a partly spherical portion and wherein the partly spherical portion contacts the engagement hole.

* * * * *